April 14, 1925.  
E. A. SOHN  
SHEAVE  
Filed March 19, 1924
1,533,476
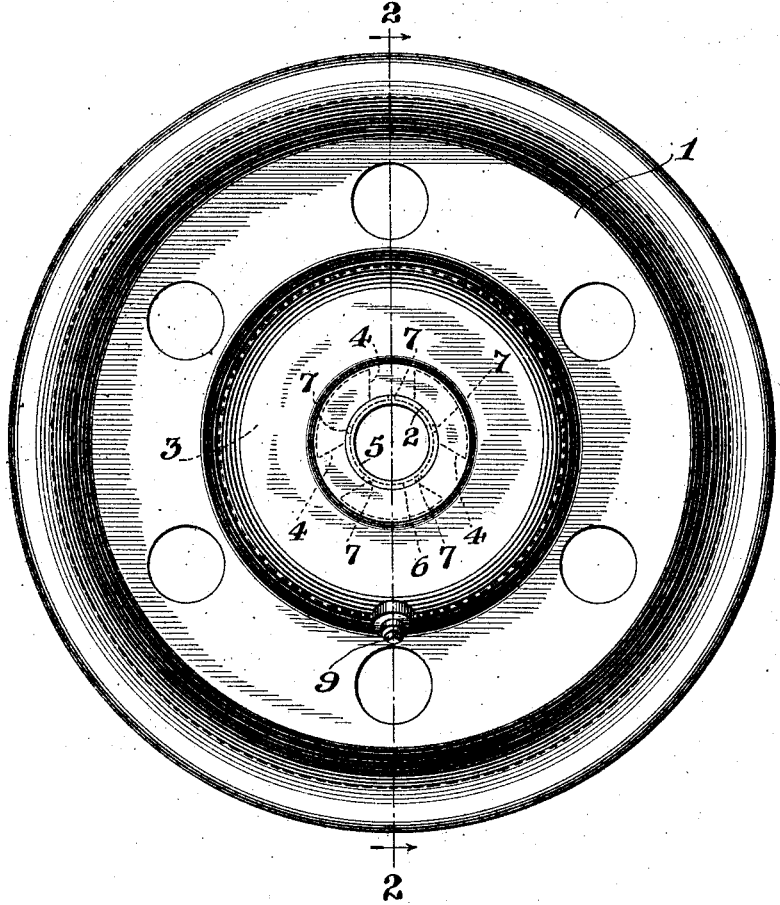
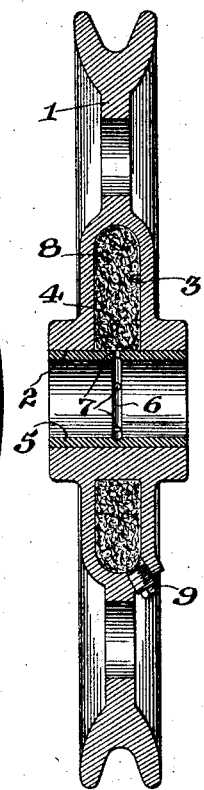
Inventor  
Edward A. Sohn  
By Frank H. Schwartz  
Attorney Patented Apr. 14, 1925.

1,533,476

UNITED STATES PATENT OFFICE.

EDWARD A. SOHN, OF BEDFORD, INDIANA, ASSIGNOR TO BEDFORD FOUNDRY & MACHINE COMPANY, OF BEDFORD, INDIANA, A CORPORATION OF INDIANA.

SHEAVE.

Application filed March 19, 1924. Serial No. 700,267.

*To all whom it may concern:*

Be it known that I, EDWARD A. SOHN, a citizen of the United States, residing at Bedford, in the county of Lawrence and State of Indiana, have invented new and useful Improvements in Sheaves, of which the following is a specification.

This invention relates to sheaves, pulleys, and the like. The object is to produce a sheave especially adapted to successfully stand up under the severe conditions encountered in use in derricks etc. In such severe uses, the pressure per square inch in the bushing of the sheave is enormous, and if the lubrication is not perfect, the bushing is quickly destroyed. To secure perfect lubrication in such use, an automatic system whereby sufficient oil or other lubricant is supplied in just the proper amount, without needless wasting of the oil is imperative. Also, the area of the bearing surface of the bushing should be reduced as little as possible by any oil groove construction, in order that the bearing area may be the greatest possible.

To this end a sheave has been devised, which meets these requirements with great success. It comprises few parts easily assembled, and of such construction that the sheave is self lubricating under the severe conditions of service, for long periods of time. It comprises a main sheave body having a central bore and an annular oil or lubricant chamber or cellar surrounding and spaced from the central bore and connected thereto by a plurality of passages. In the central bore is a bushing preferably of anti-friction metal and having a central annular oil supplying recess or groove connected by holes leading to the passages which connect with the oil or lubricant chamber. The oil chamber is preferably packed with oil and waste. By providing a central annular recess in the bushing, the bearing surface is reduced but slightly, and yet it is found in practice that oil is supplied so successfully to the entire bearing area, that the usual rapid destruction or cutting out of the bushing is avoided. Also, while this annular recess gives perfect lubrication, on account of its being placed the maximum distance from the outer ends of the bushing, oil is not wasted by leaking or oozing out of the ends of the bushing.

Other objects and advantages will appear from the specification taken in connection with the accompanying drawing in which—

Figure 1 is a side elevation of the sheave; and

Figure 2 is a sectional view on line 2—2 of Fig. 1.

The same numerals refer to the same parts in both views.

The sheave comprises a main body having a central bore 2 and an annular oil or lubricant chamber or cellar 3, surrounding, and spaced from the central bore 2, and connected thereto by a plurality, preferably three equally spaced passages 4. In the central bore, is a bushing 5 preferably of anti-friction metal and having a central annular oil supplying recess 6 connected by a plurality, preferably five equally spaced, holes 7. In whatever angular position the bushing is assembled in the central bore, at least one or more holes 7 will lead to at least one or more of passages 4, which latter connect with oil chamber 3. Also, if the bushing slips circumferentially while in use, there will always be at least one oil hole 7 in proper position to maintain the supply of oil. Chamber 3 is preferably packed with oil and waste 8. A plug 9 permits oil to be supplied at suitable intervals of time.

In actual use, a large amount of oil is held by the waste, and a small quantity is gradually fed through holes 7 to the annular oil supplying recess 6. From the annular recess 6 the oil very slowly and gradually works out in both directions toward the ends of the bushing. But owing to the central position of the groove 6, while oil is fed fast enough for perfect lubrication, it is not fed fast enough to be wasted by leaking or oozing out the ends of the bushing. The great importance of these two features is seen when the extremely severe conditions of service to which the sheave is commonly put, are considered. In actual use a sheave having a bushing 4½" long with a hole $2\tfrac{7}{16}$" diameter is used on a derrick to lift 30 tons. The importance of having good lubrication without using such kinds of recesses or grooves as materially diminish the bearing area, is therefore apparent. Also as these sheaves are used in situations, not readily accessible to frequent hand oiling, the oil should not be fed any faster than absolutely required. By the particular constructions set forth all these desirable results are secured in a maximum degree.

I claim:

A sheave comprising, a main body provided with a bore, said main body having end portions integrally connected together by substantial connecting portions forming part of said bore and providing an oil passage intermediate each two successive connecting portions, a bushing in said bore, and oil feeding holes extending through the wall of the bushing, the number, spacing, and circumferential width of oil passages, being so related to the number and spacing of the oil feeding holes, that at least one of said holes registers with one of said passages, irrepective of the circumferential position of any point on said bushing relative to any point in said bore.

EDWARD A. SOHN.